(12) United States Patent
Wilson et al.

(10) Patent No.: US 10,031,753 B2
(45) Date of Patent: Jul. 24, 2018

(54) COMPUTER SYSTEMS AND METHODS FOR EXECUTING CONTEXTS WITH AUTONOMOUS FUNCTIONAL UNITS

(71) Applicant: FREESCALE SEMICONDUCTOR, INC., Austin, TX (US)

(72) Inventors: Peter J Wilson, Leander, TX (US); Brian C Kahne, Austin, TX (US)

(73) Assignee: NXP USA, Inc., Austin, TX (US)

( * ) Notice: Subject to any disclaimer, the term of this patent is extended or adjusted under 35 U.S.C. 154(b) by 426 days.

(21) Appl. No.: 14/719,390

(22) Filed: May 22, 2015

(65) Prior Publication Data
US 2016/0342421 A1 Nov. 24, 2016

(51) Int. Cl.
*G06F 9/30* (2018.01)
*G06F 9/38* (2018.01)

(52) U.S. Cl.
CPC ...... *G06F 9/30105* (2013.01); *G06F 9/30123* (2013.01); *G06F 9/3828* (2013.01); *G06F 9/3851* (2013.01); *G06F 9/3891* (2013.01)

(58) Field of Classification Search
None
See application file for complete search history.

(56) References Cited

U.S. PATENT DOCUMENTS

| | | | | |
|---|---|---|---|---|
| 6,823,517 B1* | 11/2004 | Kalman | ......... | G06F 9/461 718/100 |
| 2005/0216709 A1* | 9/2005 | Tamai | ......... | G06F 9/462 712/228 |
| 2010/0122066 A1* | 5/2010 | Fischer | ......... | G06F 9/3851 712/205 |
| 2012/0072707 A1* | 3/2012 | Arndt | ......... | G06F 9/3004 712/234 |

* cited by examiner

*Primary Examiner* — William B Partridge

(57) ABSTRACT

In a pipelined element configured to execute multiple contexts and including an instruction pipeline and a plurality of context modules each having a register file and a functional unit, a method includes scheduling a first context for execution in the instruction pipeline. The instruction pipeline includes an execution unit having a plurality of functional units. Each functional unit of the plurality of functional units is configured to execute instructions of a scheduled context of the plurality of contexts. A first instruction of the first context which precedes an instruction loop of the first context is executed. In response to executing the first instruction, the first context is released from being scheduled for execution in the instruction pipeline and execution of the first context is continued using a first context module. The first context module includes a context-specific functional unit configured to execute the instruction loop.

19 Claims, 4 Drawing Sheets

COMPUTER SYSTEMS AND METHODS FOR EXECUTING CONTEXTS WITH AUTONOMOUS FUNCTIONAL UNITS

BACKGROUND

Field

This disclosure relates generally to computer processor architecture, and more specifically, to context switching in multi-threaded computer processors with autonomous functional units.

Related Art

With a network of processing cores, one can quickly build a very highly parallel computational machine which is well-suited to specific domains such as image processing and digital signal processing. However, in practice, some of the 'nodes' in the network have very little to do and remain idle for a good portion of time. For example, during a given time period, one node simply splits incoming data; one node just delays the incoming data by a clock cycle; and one node just does uses the incoming data in an addition operation. Each such trivial operation requires a complete core, along with a network fabric interface. While the model is widely used, and the software easy to write, the model consumes a lot of power and requires a lot of area in a semiconductor device. It is therefore desirable to make better use of available computational and power resources.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein provide a multithreading core with multiple contexts and one or more functional units associated with at least some of the contexts. Instructions and resources are provided to offload execution of a context to the functional unit(s) associated with the context when appropriate and allow the core to execute other contexts while the offloaded context is executing with the associated functional unit(s).

Figure 1:
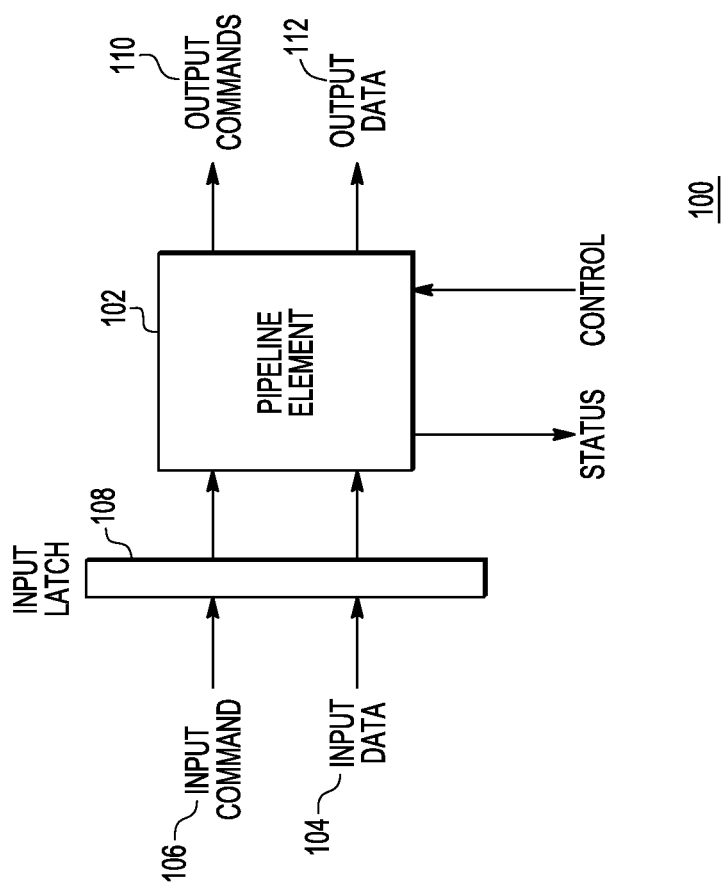
FIG. 1 illustrates, in block diagram form, a portion of a pipelineable data processing system in accordance with an embodiment of the present invention.

FIG. 1 illustrates, in block diagram form, a portion of a pipelined data processing system 100 in accordance with an embodiment of the present invention including processing unit or pipelined element 102 which is responsive to input data 104 and input commands 106 received through input latch 108. Pipelined element 102 executes instructions for one or more threads, and generates output commands 110 and output data 112 which are used to interface with other circuits. The detailed behavior of pipelined element 102 may be controlled via information sent on one or more control lines and may provide status via one or more status lines.

Figure 2:
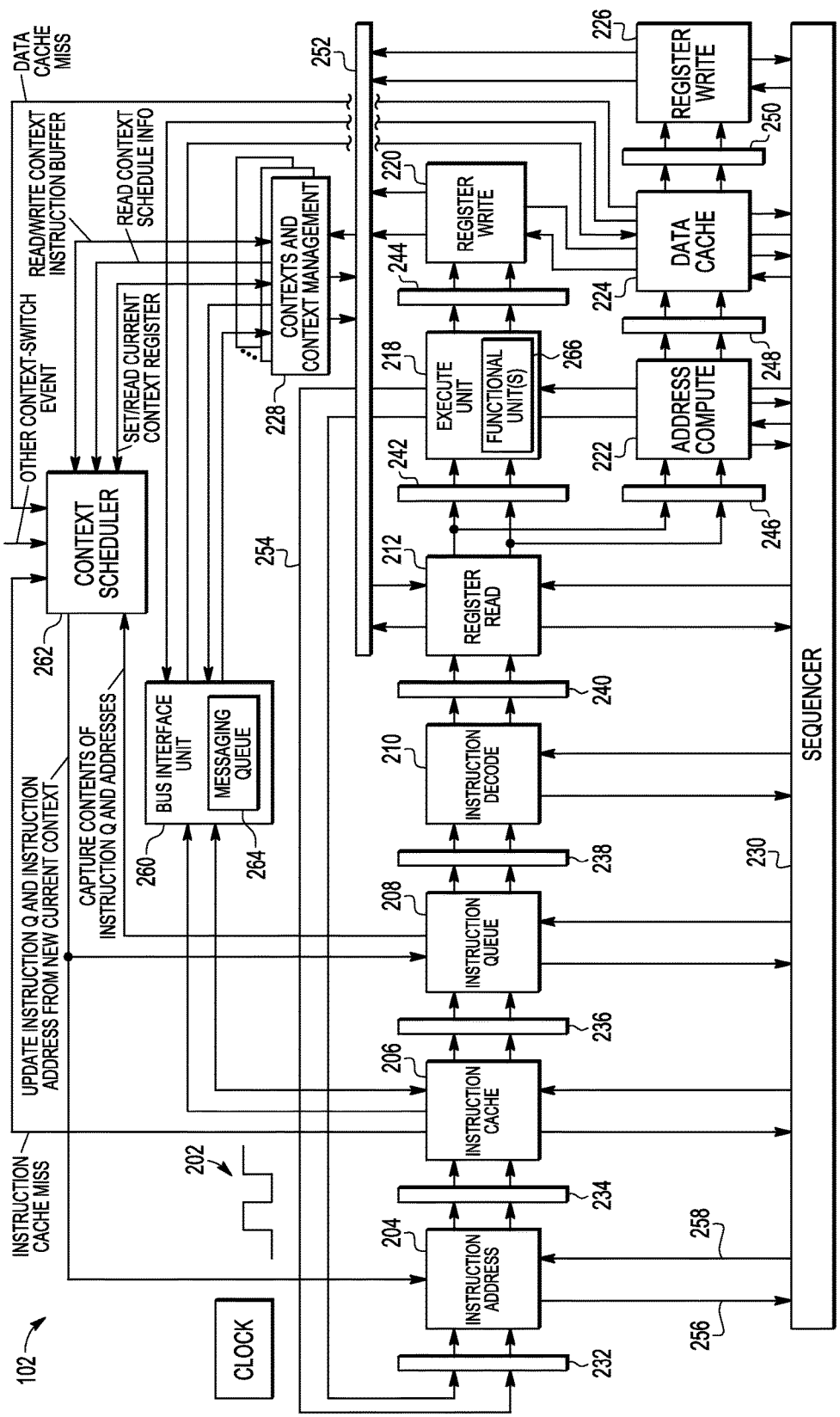
FIG. 2 illustrates in block diagram form an exemplary processor of the data processing system of FIG. 1 in accordance with one embodiment of the present invention.

FIG. 2 illustrates in block diagram form further detail of an embodiment of pipelined processing system 100 of FIG. 1. For the purposes of example, a canonical pipelined microprocessor is described herein, however the claims are not intended to be limited to a particular processing system architecture and one of ordinary skill in the art will appreciate that other microprocessor configurations can be used as well. A canonical pipelined microprocessor includes a number of different pipelined elements 102, each generally of the form depicted in FIG. 1. In operation, each pipelined element 102 reads data and performs various appropriate internal operations in response to a clock signal 202. Other configurations that are self-timed are also possible.

A pipelined processing system 100 constructed with one or more pipelined elements 102 generally includes instruction address block 204, an instruction cache 206, an instruction queue block 208, an instruction decode block 210, a register read block 212, an execute unit 218 with one or more functional units 266, a register write block 220, an address compute unit 222, a data cache 224, a second register write block 226, two or more contexts and context management units 228, and a sequencer 230, as well as a plurality of input latches 232-252 associated with each functional block. Also included is a branch path 254 and control and status signals for each pipelined element 102. For simplicity only one pair of status and control signals are represented by designators 256, 258. Pipelined element 102 can also include Bus Interface Unit (BIU) 260, context scheduler 262, and messaging queues 264 associated with BIU 260. Functional units 266 can include one or more of an arithmetic logic unit, multiply unit, divide unit, floating point unit, or other suitable unit to perform functions required by pipelined element 102. Again, other configurations for pipelined element 102 can be used.

Figure 3:
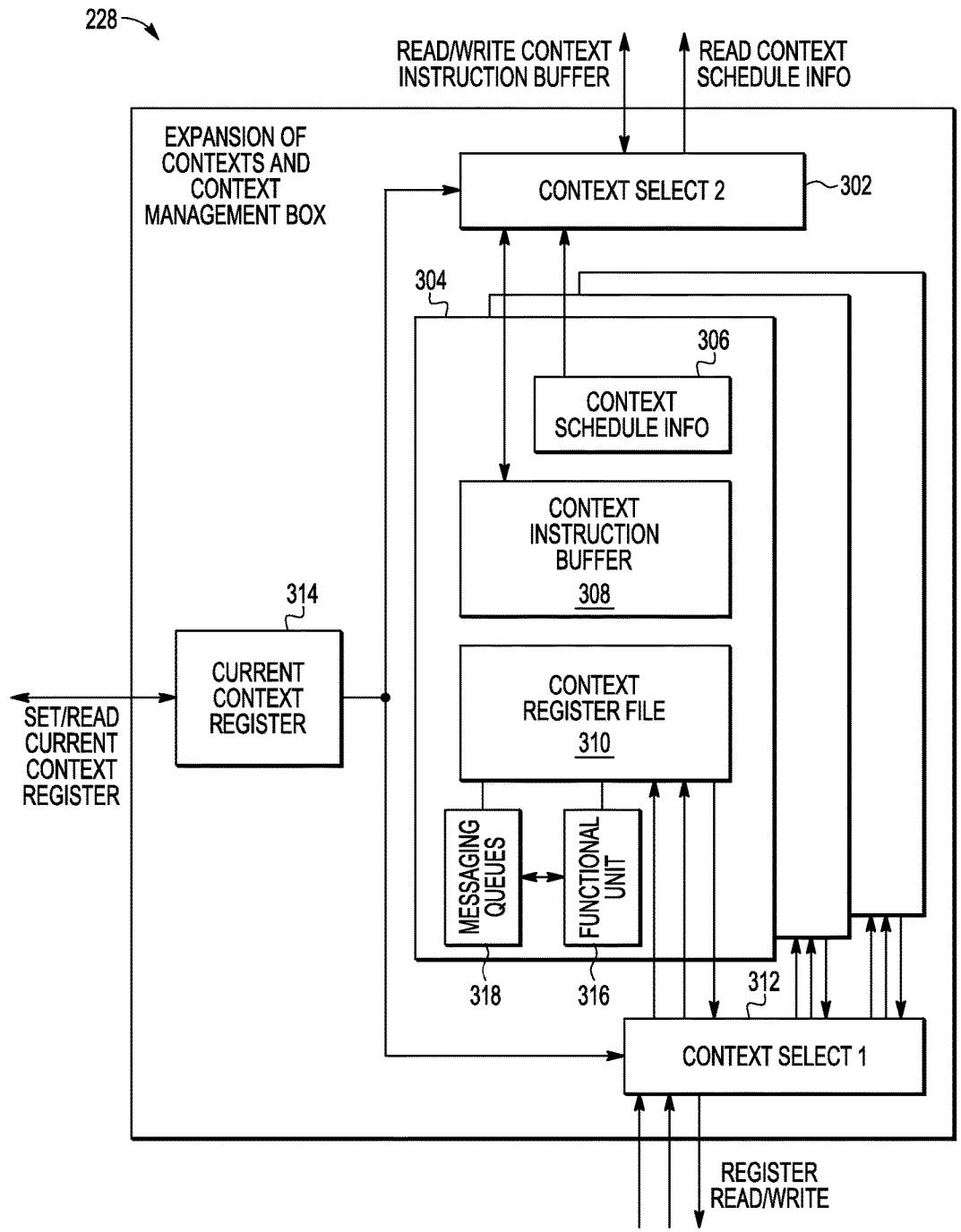
FIG. 3 illustrates in block diagram form further detail of the contexts and context management unit of FIG. 2 in accordance with one embodiment of the present invention.

Referring to FIGS. 2 and 3, FIG. 3 illustrates in block diagram form further detail of one of contexts and context management units 228 of FIG. 2 that includes first and second context select interfaces 302, 312, one or more context modules 304 that each include context schedule information 306, context instruction buffer 308, and context register file 310, current context register 314, one or more functional units 316, and messaging queues 318. Context scheduler 262 is coupled to provide information to update instruction queues and addresses associated with a new context to instruction address block 204 and instruction queue 208. Information that may cause a context switch is provided to context scheduler 262 from various sources, such as, for example, instruction cache misses from instruction cache 206 and data cache misses from data cache 224. Other information that can cause a context switch can be provided to context scheduler 262 from other appropriate sources.

Contexts and context management unit 228 communicates with context scheduler 262 to set/read a current context register file 310, read context schedule information 306 from context scheduler 262, and to read or write a context instruction buffer 308. Contexts and context management unit 228 also communicates with latch 252 to read/write register file 310 for one or more contexts 304. Context select interface 302 provides or retrieves information from context schedule information 306 and context instruction buffer 308 of a selected context 304. Context select interface 312 provides or retrieves information from the register file 310 of a selected context 304. Current context register 314 can be used to indicate the current context, and can be accessed to set or read the context being executed, and to provide current the context to context select interfaces 302, 312.

Functional unit(s) 316 can include one or more of an arithmetic logic unit, multiply unit, divide unit, floating point unit, or other suitable unit to perform functions required by a particular context 304. Messaging queues 318 and functional unit(s) 316 are configured to communicate with one another and with context register file 310. Note that one or more of functional unit(s) 316 can be shared among two or more contexts and context management units 228. Alternatively, each context 304 can have it own dedicated functional unit(s) 316, although a combination of shared and dedicated functional units 316 can be used in contexts and context management unit 228. Functional units 316 associated with a context are referred to as context-specific functional units 316. The combination of messaging queues 318 and functional unit(s) 316 enables a loop of instructions to continue being executed for a particular context in one or more of functional unit(s) 316 independently of another context associated with a different thread being executed in execution unit 218.

Instruction block 204 stores a value representing the address of the next instruction to be executed. This value is presented to input latch 234 of the instruction cache 206 at every clock signal, prior to the rising edge of the clock. The instruction cache 206 then uses this address to read the corresponding instruction from within itself. The instruction cache 206 then presents the address and instruction to the instruction queue block 208 before the next rising clock edge via latch 236. On the rising clock edge, the instruction queue block 208 adds the address and the instruction to the end of its internal queue and removes the instruction and address at the bottom of its queue before the next rising edge of the clock, providing both the instruction and address through latch 238 to the instruction decode block 210. The instruction decode block 210 reads the instruction and address from its input latch 238 at the rising edge of the clock. The instruction decode block 210 examines the instruction and generates output data containing (depending on the instruction) specifications of the registers to be used in the execution of the instruction, any data value from the instruction, and a recoding of the operation requested by the instruction.

The register read block 212 reads the incoming data from the instruction decode block 210 at the rising edge of the clock and causes, through latch 252, reads the values of the current context register 304 in the first half of the clock period. The information from the current context register 304 and the decode block 210 is provided to the address compute unit 222 and the execute unit 218 before the clock's next rising edge. Both the address compute unit 222 and the execute unit 218 read the data from their input latches 246, 242 respectively, before the rising edge of the clock. One portion of the data specifies the operation required, and either the execute unit 218 or the address compute unit 222 will obey. The execute unit 218 that does not obey produces no output.

If the execute unit 218 is required to act, execute unit 218 will perform the appropriate computation on the values provided and will produce an output before the rising edge of the next clock. This output is read at the rising edge by the register write block 220 which receives a destination register specifier and a value to be written thereto.

If the operation requested requires the address compute unit 222 to act, the execute unit 218 performs no function, and the address compute unit performs appropriate arithmetic functions, such as adding two values, and provides the result to the data cache 224 along with the requested operation before the next rising edge of the clock. The data cache 224 reads this information from input latch 248 at the rising edge of the clock, and performs appropriate action on its internal memory, within the clock timeframe. If the operation requested is a load operation, the value read from the data memory 224 is presented to the second write register 226, before the rising edge of the clock. On the rising edge of the clock, the second write register 226 captures the register specifier and value to be written, and forces the current context register 314 to write to that specified register. The sequencer 230 has knowledge of how much time the various execution units require to complete the tasks they have been given and can arrange for one or more pipelined elements 102 in the microprocessor pipeline to freeze (for example when a multi-cycle instruction writes a register used as a source in the next instruction).

The sequencer 230 communicates with components of pipelined element 102 by reading the status signal 256 and providing the control signal 258. Some instructions, such as multiplication instructions often take multiple cycles.

In addition to the above description, the pipelined element 102 can utilize branch instructions, which may cause the microprocessor to execute an instruction other than the next sequential instruction. Branches are further handled by branch path 254 from the execute unit 218 to the instruction address block 204. When a branch must be taken, the execute unit 218 provides the desired address and signals to the sequencer 230. The instruction address block 204 changes its stored internal value to the new address and provides it to the instruction memory 206. The sequencer 230 tracks the progress of the new instruction down the pipeline, ensuring that no registers are changed by instructions in the pipeline between the branch instruction and the new instruction.

The instruction cache 206 and data cache 224 may also be implemented as simple memories or as a hierarchy of caches if desired. Memory management units (MMUs) (not shown) may also be provided to operate in parallel with the caches 206, 224 and provide address translation and protection mechanisms.

When the instruction cache 206 or data cache 224 do not contain the data requested then the sequencer 230 may cause them to signal the Bus Interface Unit (BIU) 260 through the appropriate cache. The BIU 260 intercedes between the pipelined element 102 and the rest of the system 100 (FIG. 1), marshaling requests (such as a request to read a memory location or to write a memory location) to the rest of the system 100 and capturing and properly directing responses from the system to pipelined element 102.

Rather than using the sequencer 230 to have specific knowledge of how long an operation might take, each register in the context register files 310 can be provided with a busy bit. A busy bit can be set to a first value such as 1 if a register in one of the register files 310 is not available for use, and can be set to a second value such as 0 if a register in one of the register files 310 is ready for use. When a multiple-cycle operation such as a multiply or a read from the data cache 224 occurs, the destination register in a context register file 310 can have its busy bit set by the sequencer 230. Before reading a register in a register file 310, the Register Read stage 212 can check that all register's busy bit indicates that the register is available. If a register file 310 has a set busy bit, the sequencer 230 stalls that instruction at the register read stage, awaiting completion of a prior operation targeting the register file(s) 310 with busy bits. When all register files 310 involved have zero busy bits, the instruction is allowed to continue, setting an appropriate busy bit if it is a multicycle operation.

Figure 4:
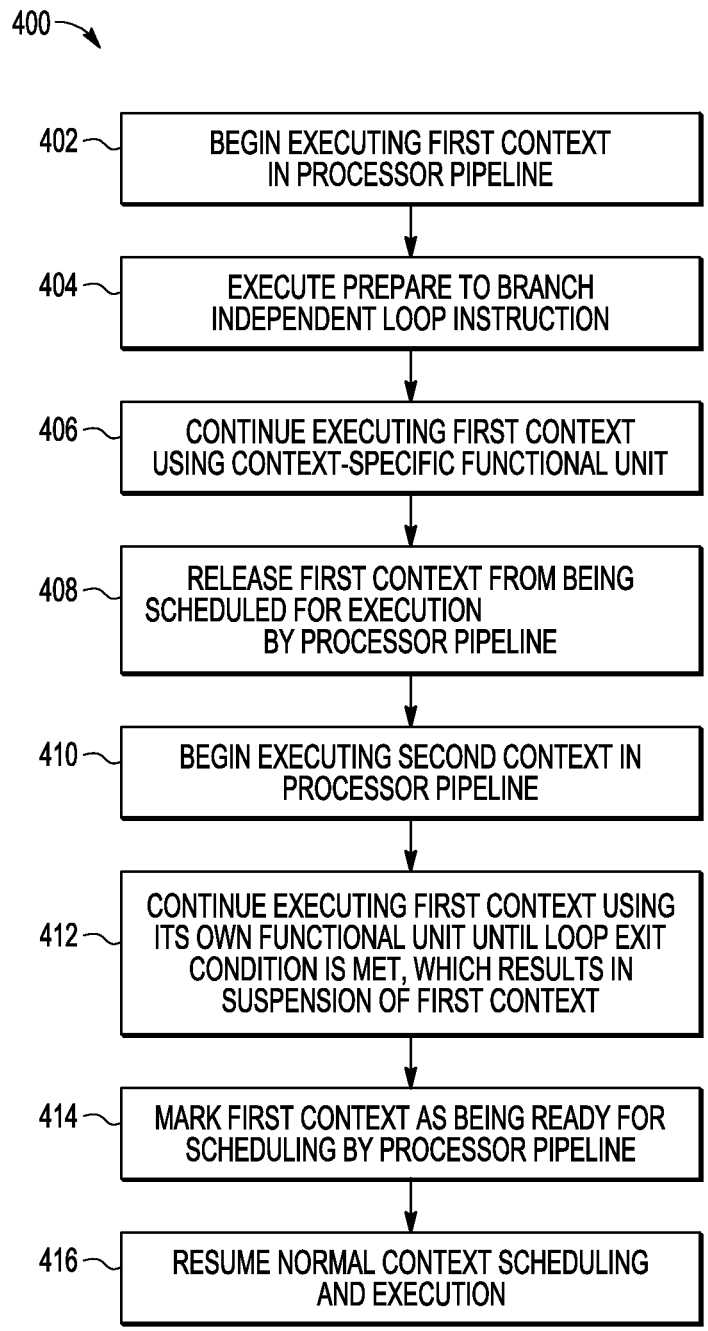
FIG. 4 illustrates, in flow diagram form, a method of executing contexts with autonomous functional units in accordance with an embodiment of the present invention.

Referring to FIGS. 2, 3 and 4, FIG. 4 illustrates, in flow diagram form, a method 400 of switching contexts in pipelined element 102 in accordance with an embodiment of the present invention. Process 402 includes executing a first context in pipelined element 102. In process 404, an instruction associated with the first context is executed that indicates a loop of instructions is coming up that can be executed in one or more of the functional units 316 associated with the first context. The instruction can be referred to as a "prepare to branch independent loop" or other suitable name. When the "prepare to branch independent loop" instruction is executed, process 406 continues executing the first context using one or more context-specific functional units 316, as required by the instruction(s) in the loop. In particular, a loop of instructions can include the same instruction executed a number of times, or a series of instructions executed a number of times. Different context-specific functional units can be used, as required, when different instructions are included in the loop.

In process 408, the first context is released from being scheduled for execution by context scheduler 262 in pipelined element 408. Process 408 can be performed before, concurrently, or just after process 406 is performed or being performed. Once the first context is released from scheduling in the pipeline, process 410 begins executing a second context in the pipeline of pipelined element 102. As such, the second context may use one or more functional units 266 in pipelined element 102, and is subject to scheduling and de-scheduling by context scheduler 262. Significantly, the first context continues executing in functional unit(s) 316 while the second context is free to use functional unit(s) 266 and the first context is not subject to scheduling by context scheduler 262.

In process 412, the first context continues executing using functional unit(s) 316 until a loop exit condition is met. For example, in some implementations, the end loop condition is met when a specific instruction indicating the end of the loop is executed. In other embodiments, the instruction(s) in the loop can include an indicator that they are part of the loop, and the context can be executed using functional unit(s) 316 until an instruction without the loop indicator is executed. Other suitable mechanisms to indicate the end of the loop can be used. Once the end of the loop is reached, process 412 includes suspending execution of the first context and process 414 marks the first context as being ready for scheduling by context scheduler 262 in pipelined element 102.

Process 416 includes resuming context scheduling for the first and second contexts, as well as other contexts for threads running in pipelined element 102, by context scheduler 262. In a system of interconnected pipelined elements 102, concurrent software programs can have the ability to communicate between pipelined elements 102. Each pipelined processing system 100 can be capable of sending and receiving messages using message send and receive instructions. Each pipelined element 102 may be a single thread processing element or a multi-threaded processing element, in which any thread of the multi-threaded processing element can send or receive messages.

A thread of processing system 100 can send a message to another processing system 100 by executing a send instruction. Upon execution of a send instruction, the processing system 100 formulates a message to be sent to a destination processing system 100. The messages may include any type of information, such as data values, commands, or combinations thereof. The messages to be sent include the contents of one or more registers in the register file of the sending (i.e. source) pipelined element. Messages can move from one interconnect node to another from the source processing system 100 until the messages reach their destination pipelined element as indicated by an address. Known routing protocols may be used to route a message from a source processing system 100 to a destination processing system 100.

Messages received by a destination processing system 100 are written into a register file of the receiving processing system 100 so that the information may be accessed by the processor of that processing system 100. However, since a thread of a processing system 100 needs to receive messages from several sources, messaging queue circuitry is used to store incoming messages which are to be processed and stored into the register file by the pipelined element. Different messaging queues of the messaging queue circuitry are used to store different classes of messages. For example, one queue might accept messages from a particular source while another queue might accept time-out messages (from local timer circuitry). The messaging queues store operands to be used for operations being performed by processing system 100. A functional unit 316 operating on a stream of data can receive operands from one or more FIFOs, a FIFO and a register, or other suitable components or combination of components. The result of the operation(s) in a particular functional unit 316 can be sent to another functional unit 316, to another processing system 100, or any other suitable location.

By now it should be apparent that in some embodiments, in a pipelined processing system configured to execute multiple contexts, wherein the processing includes an instruction pipeline, a plurality of context modules, each context module having a register file and a functional unit, a method can comprise scheduling a first context for execution in the instruction pipeline. The instruction pipeline includes an execution unit having a plurality of functional units. Each functional unit of the plurality of functional units is configured to execute instructions of a scheduled context of the plurality of contexts. A first instruction of the first context which precedes an instruction loop of the first context is executed. In response to executing the first instruction, the first context is released from being scheduled for execution in the instruction pipeline and execution of the first context is continued using a first context module. The first context module includes a context-specific functional unit configured to execute the instruction loop.

In another aspect, after releasing the first context, the method can further comprise scheduling a second context for execution in the instruction pipeline. While the second context executes in the instruction pipeline using the plurality of functional units, continuing executing the first context using the context-specific functional unit until a loop exit condition is met. Meeting the loop exit condition results in suspension of the first context.

In another aspect, after the loop exit condition is met, the method can further comprise marking the first context as being ready for scheduling for execution.

In another aspect, the instruction loop can comprise one instruction, and wherein the one instruction is executed by the context-specific functional unit.

In another aspect, the plurality of contexts can comprise a same type of functional unit as the context-specific functional unit.

In another aspect, the context-specific functional unit can be characterized as one of an arithmetic logic unit (ALU), a multiplier, a divider, or a floating point unit.

In another aspect, the first context module can comprise a plurality of context-specific functional units, wherein each context-specific functional unit is a same type of functional unit as a functional unit of the plurality of functional units.

In another aspect, the same type of functional unit of the plurality of functional units can be used to execute a second context concurrently with the execution of the first context using the first context module and the context-specific functional unit.

In another aspect, the first instruction can be characterized as a prepare to branch independent instruction.

In other embodiments, a processor can comprise an instruction pipeline having a decode unit and an execution unit. The execution unit includes a plurality of functional units, wherein each functional unit of the plurality of functional units can be configured to execute instructions of a scheduled context of the plurality of contexts. A plurality of context modules can each have context-specific control circuitry, a context-specific register file, and a context-specific functional unit. In response to the instruction decode unit decoding a first instruction of a first context, the instruction pipeline can be configured to release the first context from being scheduled for execution in the instruction pipeline, and the context-specific control circuitry of a first context module can be configured to continue execution of the first context by the first context module using the context-specific register file and context-specific functional unit of the first context module. The context-specific functional unit of the first context module is of a same type as at least one functional unit of the plurality of functional units.

In another aspect, a loop instruction follows the first instruction, and wherein the context-specific control circuitry of the first context module can be configured to continue execution of the loop instruction until a loop exit condition is met.

In another aspect, the context-specific control circuitry can be configured to mark the first context as ready for filing when the loop exit condition is met.

In another aspect, meeting the loop exit condition can result in suspension of the first context.

In another aspect, the instruction pipeline can be configured to execute a second context while execution of the first context continues by the first context module.

In another aspect, execution of the second context in the instruction pipeline can use the at least one functional unit of the plurality of functional units concurrently with the first context being executed by the first context module.

In another aspect, the context-specific functional unit of the first context module can be one of an arithmetic logic unit (ALU), a multiplier, a divider, or a floating point unit In still further embodiments, in a processor configured to execute multiple contexts, wherein the processing includes an instruction pipeline, a plurality of context modules, each context module having a register file and a functional unit, a method can comprise initiating execution of a first context in the instruction pipeline, wherein the instruction pipeline can include an execution unit having a plurality of functional units. Each functional unit of the plurality of functional units can be configured to execute instructions of a scheduled context of the plurality of contexts. A prepare to branch independent instruction of the first context can be executed.

In response to executing the prepare to branch independent instruction, the first context can be released from being scheduled for execution in the instruction pipeline and execution of the first context using a first context module of the plurality of context modules can be continued. The first context module can include a context-specific functional unit and a context-specific register file. The plurality of contexts can comprise a same type of functional unit as the context-specific functional unit.

In another aspect, after releasing the first context, the method can further comprise scheduling a second context for execution in the instruction pipeline, and while the second context executes in the instruction pipeline using the plurality of functional units, continuing executing the first context using the context-specific functional unit until a loop exit condition is met. Meeting the loop exit condition can result in suspension of the first context.

In another aspect, after the loop exit condition is met, the method can further comprise marking the first context as being ready for scheduling for execution.

In another aspect, the same type of functional unit of the plurality of functional units can be used to execute the second context concurrently with the execution of the first context using the first context module and the context-specific functional unit.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   in a pipelined processing system configured to execute multiple contexts, wherein the pipelined processing system includes an instruction pipeline, a plurality of context modules, each context module having a register file and a context-specific functional unit, scheduling a first context for execution in the instruction pipeline, wherein the instruction pipeline includes an execution unit having a plurality of functional units, wherein each functional unit of the plurality of functional units is configured to execute instructions of a scheduled context of the plurality of contexts,
   and the plurality of context modules and context-specific functional units are external to the execution unit;
   executing a first instruction of the first context which precedes an instruction loop of the first context;
   in response to executing the first instruction, releasing the first context from being scheduled for execution in the instruction pipeline and continuing execution of the first context using a first context module, wherein the first context module includes a context-specific functional unit configured to execute the instruction loop; and
   after releasing the first context, executing a second context in the instruction pipeline while the context-specific functional unit executes the instruction loop.

2. The method of claim 1 further comprising:
   while the second context executes in the instruction pipeline using the plurality of functional units, continuing executing the first context using the context-specific functional unit until a loop exit condition is met, wherein meeting the loop exit condition results in suspension of the first context.

3. The method of claim 2, wherein after the loop exit condition is met, the method further comprises:
   marking the first context as being ready for scheduling for execution.

4. The method of claim 1, wherein the instruction loop comprises one instruction, and wherein the one instruction is executed by the context-specific functional unit.

5. The method of claim 4, wherein the plurality of contexts comprises a same type of functional unit as the context-specific functional unit.

6. The method of claim 5, wherein the context-specific functional unit is characterized as one of an arithmetic logic unit (ALU), a multiplier, a divider, or a floating point unit.

7. The method of claim 5, wherein the first context module comprises a plurality of context-specific functional units, wherein each context-specific functional unit is a same type of functional unit as a functional unit of the plurality of functional units.

8. The method of claim 5, wherein the same type of functional unit of the plurality of functional units is used to execute a second context concurrently with the execution of the first context using the first context module and the context-specific functional unit.

9. The method of claim 1, wherein the first instruction is characterized as a prepare to branch independent instruction.

10. A processor comprising:
    an instruction pipeline having a decode unit and an execution unit, wherein the execution unit includes a plurality of functional units, wherein each functional unit of the plurality of functional units is configured to execute instructions of a scheduled context of the plurality of contexts; and
    a plurality of context modules external to the instruction pipeline, each context module having context-specific control circuitry, a context-specific register file, and a context-specific functional unit, wherein in response to the instruction decode unit decoding a first instruction of a first context:
       the instruction pipeline is configured to release the first context from being scheduled for execution in the instruction pipeline, and
       the context-specific control circuitry of a first context module is configured to continue execution of the first context by the first context module using the context-specific register file and context-specific functional unit of the first context module, wherein the context-specific functional unit of the first context module is of a same type as at least one functional unit of the plurality of functional units, wherein the instruction pipeline is configured to execute a second context while execution of the first context continues by the first context module.

11. The processor of claim 10, wherein a loop instruction follows the first instruction, and wherein the context-specific control circuitry of the first context module is configured to continue execution of the loop instruction until a loop exit condition is met.

12. The processor of claim 10, wherein the context-specific control circuitry is configured to mark the first context as ready for filing when the loop exit condition is met.

13. The processor of claim 12, wherein meeting the loop exit condition results in suspension of the first context.

14. The processor of claim 10, wherein execution of the second context in the instruction pipeline uses the at least one functional unit of the plurality of functional units concurrently with the first context being executed by the first context module.

15. The processor of claim 10, wherein the context-specific functional unit of the first context module is one of an arithmetic logic unit (ALU), a multiplier, a divider, or a floating point unit.

16. A method comprising:
in a processor configured to execute multiple contexts, wherein the processor includes an instruction pipeline and a plurality of context modules external to the instruction pipeline, each context module having a register file and a context-specific functional unit, initiating execution of a first context in the instruction pipeline, wherein the instruction pipeline includes an execution unit having a plurality of functional units, wherein each functional unit of the plurality of functional units is configured to execute instructions of a scheduled context of the plurality of contexts;
executing a prepare to branch independent instruction of the first context; and
in response to executing the prepare to branch independent instruction, releasing the first context from being scheduled for execution in the instruction pipeline and continuing execution of the first context using a first context module of the plurality of context modules, wherein the first context module includes a context-specific functional unit and a context-specific register file, and wherein the plurality of contexts comprises a same type of functional unit as the context-specific functional unit; and
after releasing the first context, executing a second context in the instruction pipeline while continuing executing the first context using the context-specific functional unit.

17. The method of claim 16, further comprising:
after scheduling the second context for execution in the instruction pipeline,
continuing executing the first context using the context-specific functional unit until a loop exit condition is met, wherein meeting the loop exit condition results in suspension of the first context.

18. The method of claim 17, wherein after the loop exit condition is met, the method further comprises:
marking the first context as being ready for scheduling for execution.

19. The method of claim 17, wherein the same type of functional unit of the plurality of functional units is used to execute the second context concurrently with the execution of the first context using the first context module and the context-specific functional unit.

\* \* \* \* \*